Figure 1:
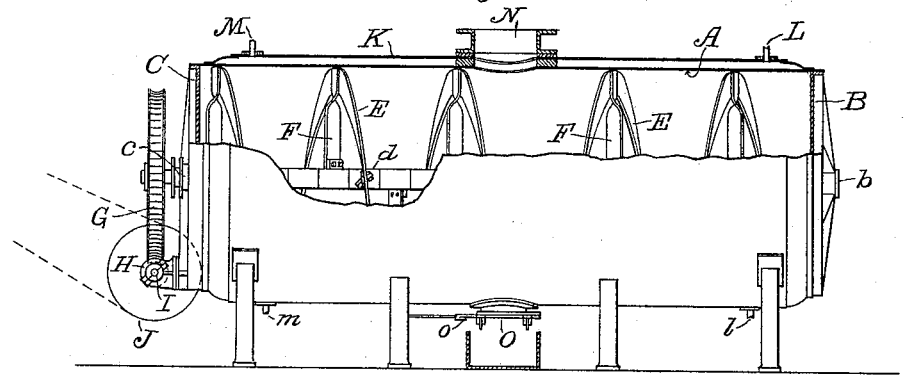

No. 607,228. Patented July 12, 1898.
H. P. DYER.
MACHINE FOR CRYSTALLIZING SUGAR.
(Application filed Jan. 14, 1897. Renewed Feb. 19, 1898.)

(No Model.)

WITNESSES:
L. G. Hopper.
Geo. Williams

INVENTOR,
Harold P. Dyer.
BY
Wm. A. Skinkle
ATTORNEY.

UNITED STATES PATENT OFFICE.

HAROLD P. DYER, OF CLEVELAND, OHIO.

MACHINE FOR CRYSTALLIZING SUGAR.

SPECIFICATION forming part of Letters Patent No. 607,228, dated July 12, 1898.

Application filed January 14, 1897. Renewed February 19, 1898. Serial No. 670,974. (No model.)

*To all whom it may concern:*

Be it known that I, HAROLD P. DYER, a citizen of the United States, residing in Cleveland, in the county of Cuyahoga and State of Ohio, have invented certain new and useful Improvements in Machines for Crystallizing Sugar, of which the following is a specification, that will enable those skilled in the art to which my invention pertains to make and use the same.

My invention relates to crystallizing machinery, preferably of the horizontal cylindrical type, into which are drawn the condensed-syrup products of the vacuum-pans or evaporators, there to be agitated or kept in constant motion, until thoroughly crystallized, by means of narrow worms or screw-blades carried on the ends of radial arms which are supported and revolved by a central longitudinal shaft mounted in suitable bearings in the cylinder-heads. The rotation of these screw-blades in the mass which fills the cylinder moves the outer or peripheral portions of the mass which lie near the cylinder in an endwise direction or directions, either from the center toward the ends of the cylinder or from the ends toward the center of the cylinder or from one end to the other end of the cylinder, as may be preferred or deemed most expedient in each particular case. This endwise movement of the outer portions of the mass is ultimately opposed or checked by contact with the head or heads of the cylinder or by the meeting of the two masses moving in opposite directions from the ends toward the center of the cylinder. When the endwise movement of the outer portion of the mass is thus opposed or checked, congestion is avoided by reason of the fact that the flow is diverted by the opposition encountered from the periphery toward the axis of the cylinder and thence back along the middle of the cylinder toward the original starting-point. Thus the whole charge in the cylinder is kept in a constant state of movement, with the central portions moving in opposite directions to the peripheral portions. Now while the peripheral portions of the charge are forced to move lengthwise of the cylinder by the screw-blade, with nothing to retard them but frictional contact with the cylinder, the central returning portions are forced to flow back to the starting-point through the field traversed by the arms which extend from the shaft to support the screw-blade. The rotary movement of these arms is transverse to and cuts across the direction of flow of the central portion of the charge in the cylinder. As heretofore constructed these arms have constituted an obstacle to the returning flow of the central portion of the mass, and in certain constructions they have even exerted a strong counter influence against this flow. These arms have usually been secured to the shaft and the screw-blade in any suitable manner. They may have been integral with their hubs, which were keyed to the shaft, or a series of hubs have been secured to the shaft and provided with short flanges or bosses, to which the arms were properly secured by bolts or rivets. Sometimes the arms have been round or substantially square in cross-section, in which event they merely obstructed the flow of the mass. In other cases the arms have been composed of flat straight pieces of bar-iron comparatively thin and wide and secured at their ends to the screw-blade and the hubs on the shaft, respectively. As these arms have been secured flatwise to the screw-blade, they have taken the same angle as the pitch of the blade relatively to the axial line of the shaft. The angle of the arms, therefore, has been the same as the angle or pitch of the screw-blades, tending to facilitate the flow of the outer or peripheral portion of the mass, but exerting a strong counter influence against the flow of the inner portion of the mass. The object of my invention is to so construct these arms in that portion of their length between the screw-blade and the hub that they will aid instead of retard the flow of the inner portion of the mass.

It consists of a crystallizing-cylinder, and a screw-blade located therein and supported by arms carried by a revolving central shaft, the arms being so constructed that that portion of their length between the inner diameter of the screw-blade and the hubs to which they are attached shall be twisted or pitched in an opposite direction to the pitch of the screw, as will hereinafter be set forth.

The accompanying drawings show my invention in the best form now known to me;

but changes obvious to a skilful mechanic in the details of construction or relative positions of the parts might be made therein without departing from the spirit of my invention as set forth in the claim at the end of this specification.

Figure 2:
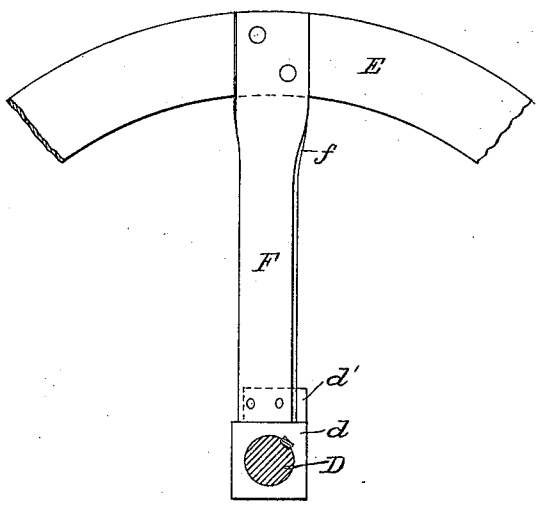
Figure 3:
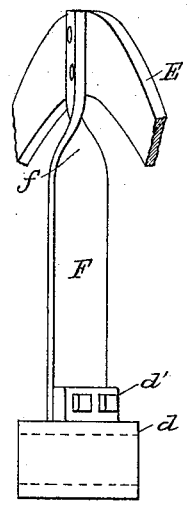

Figure 1 is a side elevation, partly in longitudinal central section, of a crystallizing-cylinder the screw-blade in which is supported by arms made in accordance with my invention. Fig. 2 is a side view of part of a screw-blade and one of my improved arms attached to and supporting it from the central shaft. Fig. 3 is a view of the edge of the screw-blade with its supporting-arm, &c., as seen at right angles to Fig. 2.

The crystallizing-cylinder A is of the usual construction. Its ends are closed by heads B and C, in which are formed bearings $b$ and $c$, in which is mounted, so as to revolve freely, the shaft D, which carries the screw-blades E through the medium of the arms F. This shaft is preferably driven by means of a worm-wheel G on its outer projecting end meshing with a worm H on a counter-shaft I, mounted in suitable bearings on the end of the cylinder and driven by a pulley J. The cylinder is preferably surrounded by a water or steam jacket K, having suitable steam and water supply pipes L and M at the top and corresponding with exhaust-pipes $l$ and $m$ at the bottom. The cylinder is charged through the opening N at its top and discharged through the opening O at the bottom, closed by a suitable gate or slide-valve $o$. There is nothing particularly new in all these details of the construction of the cylinder, &c., and they are not claimed herein, but are only shown for the purpose of illustrating the application of my invention, which lies entirely in the arms connected to the shaft and supporting the screw-blades.

On the shaft D is preferably mounted and keyed a series of hubs $d$, provided at one side with lugs or bosses $d'$, set at any desired angle to the shaft, but pitched in the opposite direction to the angle of that portion of the screw-blade which it faces. The arms F are composed of thin flat metal bolted flatwise to the lugs $d$ and preferably standing at substantially the same angle to the axis of the shaft throughout the greater portion of their length. At a point near their outer extremities, however, they are twisted, as at $f$, so that the outer ends stand at the same angle as the screw-blade against which they are riveted and at an angle more or less transverse to the remaining portions of the arms. The angle of the portions of the arms between the screw-blade and the hubs may vary to any extent desired and may be uniform throughout this length, as shown, or of increasing or decreasing pitch as it proceeds from center to circumference, as is usual in propeller-blades and mechanism of like nature, the essential features, however, being that it shall be pitched in an opposite direction to the screw-blade, to which it is attached at its outer end.

By this construction it will be seen that although the screw-blade and the arms revolve together the blade forces the outer portion of the mass to flow in one direction, while the arms assist the flow of the inner portion of the mass in an opposite direction. This results in a more smooth and even action on the mass than has heretofore been attained, producing a more thorough crystallization in less time than heretofore and a greater amount of sugar with less of the low products or waste syrups which are usually left over in the manufacture of beet-root sugar, for which my invention is particularly adapted, although it is of course applicable to the manufacture of cane and other sugars.

Having thus described my invention, what I claim as new and useful, and desire to secure by Letters Patent, is—

In a crystallizing-cylinder, the combination of the central revolving shaft, the narrow agitating worm or screw blade located near the sides of the cylinder, the flattened arms which connect and support the screw-blades from the shaft, with that portion of their length between the screw-blade and the shaft, formed to stand at an angle opposite to the angle or pitch of the screw-blade, substantially as and for the purpose hereinbefore set forth.

In testimony whereof I affix my signature, in the presence of two witnesses, at Cleveland, Ohio, December 18, 1896.

HAROLD P. DYER.

Witnesses:
JOHN H. BYRNE,
M. MILLARD.